United States Patent
Liu

(10) Patent No.: US 9,310,818 B2
(45) Date of Patent: Apr. 12, 2016

(54) VOLTAGE CONVERTER AND REGULATING CIRCUIT CONTROL CHIP

(71) Applicant: Nuvoton Technology Corporation, Hsinchu Science Park (TW)

(72) Inventor: Chun-Hsin Liu, Houlong Township, Miaoli County (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 0 days.

(21) Appl. No.: 14/285,421

(22) Filed: May 22, 2014

(65) Prior Publication Data
US 2015/0268681 A1    Sep. 24, 2015

(30) Foreign Application Priority Data

Mar. 19, 2014  (TW) .............................. 103110247 A

(51) Int. Cl.
*H02M 3/156*   (2006.01)
*H02M 1/00*    (2007.01)
*G05F 1/575*   (2006.01)

(52) U.S. Cl.
CPC ...................................... *G05F 1/575* (2013.01)

(58) Field of Classification Search
CPC ...................... H02M 3/156; H02M 2001/0016; H02M 2001/0019; H02M 2001/0022; H02M 2001/0025
USPC .......... 323/282, 288, 265, 273, 279, 280, 351
See application file for complete search history.

(56) References Cited

U.S. PATENT DOCUMENTS

| 2009/0322302 A1* | 12/2009 | Fukushi ........................ 323/284 |
| 2010/0033215 A1 | 2/2010 | Fogg et al. |
| 2010/0066328 A1* | 3/2010 | Shimizu et al. ............... 323/282 |
| 2011/0031948 A1 | 2/2011 | Chien et al. |
| 2011/0316518 A1* | 12/2011 | Feng et al. .................... 323/349 |

(Continued)

FOREIGN PATENT DOCUMENTS

| CN | 102761254 A | 10/2012 |
| CN | 102761261 A | 10/2012 |

(Continued)

OTHER PUBLICATIONS

Taiwanese Office Action in corresponding Taiwanese application 103110247 dated Dec. 21, 2015, pp. 1-3.

*Primary Examiner* — Timothy J Dole
*Assistant Examiner* — Sisay G Tiku
(74) *Attorney, Agent, or Firm* — Muncy, Geissler, Olds & Lowe, P.C.

(57) ABSTRACT

A voltage converter having a regulating circuit controlled by a duration adaptive pulse signal is disclosed. An input voltage is regulated by the regulating circuit according to the pulse signal to generate an output voltage. A first comparator of the voltage converter compares a first reference signal with a feedback value of the output voltage and thereby generates a first comparator output. The first reference signal fluctuates with the pulse signal. The voltage converter further includes an active-duration adjusting circuit that starts the active duration of the pulse signal in accordance with the first comparator output and ends the active duration of the pulse signal in accordance with a second reference signal. The DC value of the second reference signal depends on the duty cycle of the pulse signal.

8 Claims, 3 Drawing Sheets

(56) References Cited

U.S. PATENT DOCUMENTS

2013/0033248 A1* 2/2013 Granger .................. 323/288
2013/0200869 A1* 8/2013 Sasao et al. .................. 323/282

FOREIGN PATENT DOCUMENTS

TW 200807843 A 2/2008
TW 201220661 A 5/2012

* cited by examiner

VOLTAGE CONVERTER AND REGULATING CIRCUIT CONTROL CHIP

CROSS REFERENCE TO RELATED APPLICATIONS

This Application claims priority of Taiwan Patent Application No. 103110247, filed on Mar. 19, 2014, the entirety of which is incorporated by reference herein.

BACKGROUND OF THE INVENTION

1. Field of the Invention

The present invention relates to a voltage converter and it particularly relates to a regulating circuit controlled by a pulse signal.

2. Description of the Related Art

A voltage converter is commonly used in electronic devices for voltage conversion of a voltage source, to supply power to electronic components requiring a supply voltage that is different from the voltage source. A regulating circuit of the voltage converter is typically controlled in accordance with a pulse signal to regulate an input voltage to an output voltage. It is important in this field to properly adjust the pulse signal to improve the stability and the conversion efficiency of the output voltage (e.g. reduced power dissipation and improved anti-electromagnetic interference capability).

BRIEF SUMMARY OF THE INVENTION

A voltage converter in accordance with an exemplary embodiment of the disclosure includes a regulating circuit, a first comparator and an active-duration adjusting circuit. The regulating circuit regulates an input voltage to an output voltage in accordance with a pulse signal. The first comparator compares a first reference signal with the feedback value of the output voltage to generate a first comparator output. The first reference signal fluctuates in accordance with the active duration of the pulse signal. The active-duration adjusting circuit starts the active duration of the pulse signal in accordance with the first comparator output and ends the active duration of the pulse signal in accordance with a second reference signal. The DC value of the second reference signal depends on the duty cycle of the pulse signal.

A regulating circuit control chip in accordance with an exemplary embodiment of the disclosure includes a first comparator, an active-duration adjusting circuit, a first pin and a second pin. The regulating control chip provides a pulse signal to control a regulating circuit to regulate an input voltage to an output voltage. The first comparator compares a first reference signal with the feedback value of the output voltage to generate a first comparator output. The first reference signal fluctuates in accordance with the active duration of the pulse signal. The active-duration adjusting circuit starts the active duration of the pulse signal in accordance with the first comparator output and ends the active duration of the pulse signal in accordance with a second reference signal. The DC value of the second reference signal depends on the duty cycle of the pulse signal. The first pin of the regulating circuit control chip is coupled to the regulating circuit to operate the regulating circuit in accordance with the pulse signal. The second pin of the regulating circuit control chip is coupled to receive the output voltage.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
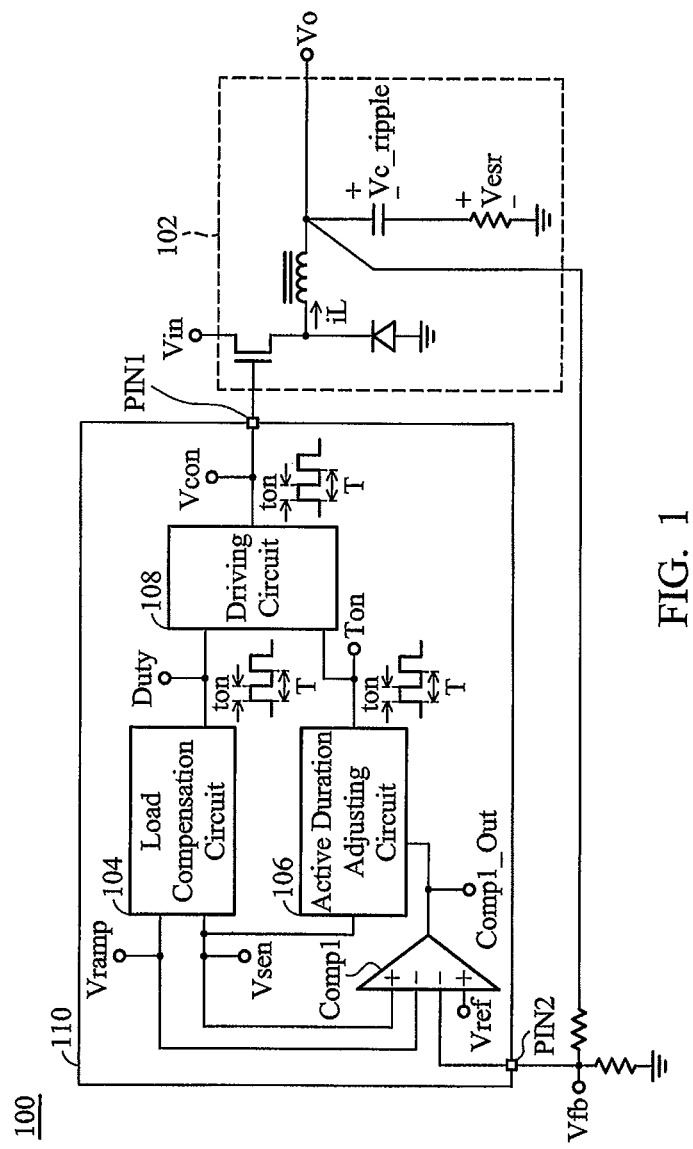
FIG. 1 illustrates a voltage converter 100 in accordance with an exemplary embodiment of the disclosure.

FIG. 1 illustrates a voltage converter 100 in accordance with an exemplary embodiment of the disclosure. The voltage converter 100 includes a regulating circuit 102, a first comparator Comp1, a load compensation circuit 104, an active-duration adjusting circuit 106 and a driving circuit 108. Based on a pulse signal Vcon, the regulating circuit 102 regulates an input voltage Vin to an output voltage Vo. As shown, the pulse signal Vcon is active during the active duration, ton, in each cycle period T. The generation of the pulse signal Vcon is discussed in the following paragraphs.

Referring to FIG. 1, the pulse signal Vcon is generated from the pulse signal Ton output from the active-duration adjusting circuit 106. The driving circuit 108 adjusts the driving capability of the pulse signal Ton to generate the pulse signal Vcon and the pulse signal Duty. The regulating circuit 102 is controlled in accordance with the pulse signal Vcon. The pulse signal Duty is generated for the load compensation circuit 104.

The load compensation circuit 104 receives the pulse signal Duty and performs a first-order filtering and a second-order filtering on the pulse signal Duty to generate a first-order filtered signal Vramp and a second-order filtered signal Vsen. The first-order filtered signal Vramp and the second-order filtered signal Vsen are conveyed into a negative input terminal and a positive input terminal of a first differential input pair of the first comparator Comp1, respectively, to generate a first reference signal (Vsen−Vramp) oscillating in accordance with the active duration of the pulse signal Ton/Duty/Vcon. The first comparator Comp1 further provides a second differential input pair and uses a positive input terminal and a negative input terminal of the second differential input pair to receive a constant reference signal Vref and a voltage-divided value Vfb of the output voltage Vo to generate a feedback value (Vref−Vfb) of the output voltage Vo. The first comparator Comp1 compares the first reference signal (Vsen−Vramp) with the feedback value (Vref−Vfb) of the output voltage Vo to generate a first comparator output Comp1_Out. The active-duration adjusting circuit 106 starts an active duration of the pulse signal Ton in accordance with the first comparator output Comp1_Out. The second-order filtered signal Vsen output from the load compensation circuit 104 is regarded as a second reference signal to end the active duration of the pulse signal Ton. The driving circuit 108 generates the pulse signal Vcon based on the pulse signal Ton to generate and provide the pulse signal Vcon to the regulating circuit 102. Note that the dc value of the second reference signal, i.e. the second-order filtered signal Vsen, depends on the duty cycle, ton/T, of the pulse signal Ton/Duty/Vcon. Thus, the active duration, ton, of the pulse signal Vcon is adjustable.

Referring to the output terminal of the voltage converter 100, when an equivalent serial resistance is too small, the vibration of the across voltage Vesr is much smaller than the across voltage Vc_ripple of the equivalent capacitor. Thus, the output voltage Vo substantially oscillates with the across voltage Vc_ripple of the equivalent capacitance. Because the first comparator Comp1 compares the feedback value (Vref−Vfb) of the output voltage Vo with the first reference signal (Vsen−Vramp) oscillating in accordance with the active duration of the pulse signal Ton/Duty/Vcon, the problem due to the oscillation of the output voltage Vo is compensated for. The regulating circuit 102 is protected from being driven by successive on-states of the pulse signal Vcon. Thus, the current iL of the regulating circuit 102 is controlled within an appropriate range to reduce the power consumption.

Furthermore, the active duration, ton, of the pulse signal Ton/Duty/Vcon is adjustable through the active-duration adjusting circuit 106 to concentrate the oscillation frequency of the pulse signal Ton/Duty/Vcon in frequency bands to facilitate the subsequent electromagnetic interference suppression.

In the exemplary embodiment shown in FIG. 1, the circuit blocks and components generating the pulse signal Vcon to control the regulating circuit 102 are manufactured into a regulating circuit control chip 110. The regulating circuit control chip 110 has a first pin PIN1 coupled to the regulating circuit 102 to operate the regulating circuit 102 in accordance with the pulse signal Vcon. The regulating circuit control chip 110 further uses a second pin PIN2 to couple to the output voltage Vo.

In other exemplary embodiments, the first comparator does not use the double differential input pairs disclosed in FIG. 1. The first comparator may be replaced by any comparator which receives a reference voltage oscillating in accordance with the active duration of the pulse signal Vcon and compares the reference signal with a feedback value of the output voltage Vo.

Furthermore, it is not intended to limit the second reference signal received by the active-duration adjusting circuit 106 to be the second-order filtered signal Vsen of the pulse signal Duty. The second reference signal may be replaced by any signal having dc value changes with the duty cycle, ton/T, of the pulse signal Vcon.

Furthermore, the driving circuit 108 is optional, selected when it is required for operations of the circuits.

Note that it is not intended to limit the structure of the regulating circuit 102 or that it be restricted to a down-conversion design.

Figure 2:
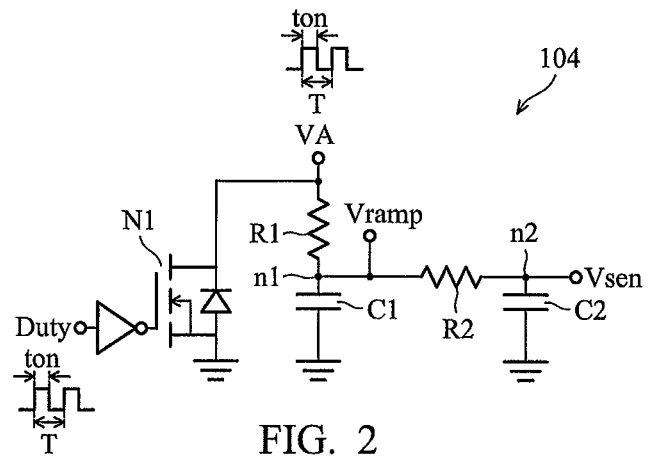
FIG. 2 illustrates a load compensation circuit 104 in accordance with an exemplary embodiment of the disclosure.

FIG. 2 illustrates a load compensation circuit 104 in accordance with an exemplary embodiment of the disclosure. The first N-type transistor N1 is coupled between the first voltage source VA and the ground, and is operated in accordance with the pulse signal Duty. The first voltage source VA provides a square wave oscillating in accordance with the pulse signal Duty. The amplitude of the first voltage source VA may be different from that of the pulse signal Duty. The first voltage source VA is coupled to ground via a first resistor R1 and a first capacitor C1 which are connected in series. A first-order filtered signal Vramp is provided at a first connection node n1 between the first resistor R1 and the first capacitor C1 and may be a triangle wave. The first connection node n1 is further coupled to the ground via a second resistor R2 and a second capacitor C2 which are connected in series. A second-order filtered signal Vsen is provided at a second connection node n2 between the second resistor R2 and the second capacitor C2, which may be a dc value, Vsen=VA·D. VA is the amplitude of the first voltage source VA. D is the duty cycle of the pulse signal Ton/Duty/Vcon.

Figure 3:
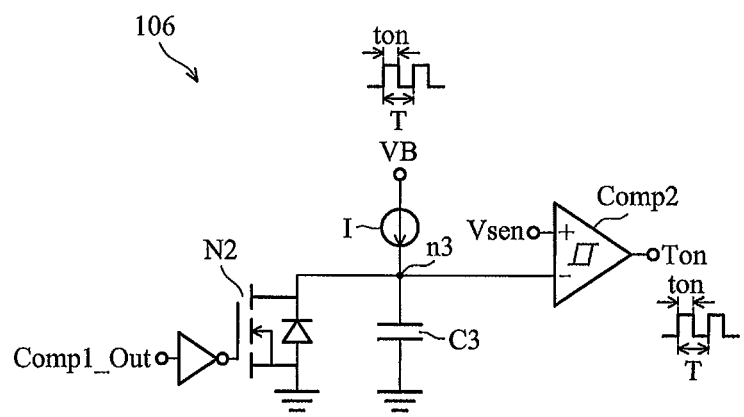
FIG. 3 illustrates an active-duration adjusting circuit 106 in accordance with an exemplary embodiment of the disclosure.

FIG. 3 illustrates the active-duration adjusting circuit 106 in accordance with an exemplary embodiment of the disclosure. The current source I is powered by the second voltage source VB. The second voltage source VB provides a square wave oscillating in accordance with the pulse signal Ton/Duty/Vcon. A third capacitor C3 receives current from the current source I and is coupled to the current source I via a third connection node n3. The second comparator Comp2 compares the second-order filtered signal Vsen (which works as the second reference signal) with the voltage level of the third connection node n3 to determine the active duration, ton, of the pulse signal Ton/Duty/Vcon. The second N-type transistor N2 is coupled between the third connection node n3 and the ground and is operated according to the first comparator output Comp1_Out. The active duration, ton, depends on the charge status of the third capacitor C3. When the current source I outputs a current VB/RI and the amplitude of the second voltage source VB is different from that of the first voltage source VA (VB=K·VA), the length of the active duration, ton, may be calculated with the following formula:

$$\text{ton} = \frac{ChargeQuantity}{ChargingCurrent} = \frac{\frac{Vsen \times C3}{VB}}{\frac{VB}{RI}} = \frac{Vsen}{VB} \times RI \times C3 = \frac{VA \times D}{K \times VA} \times RI \times C3 = D \times \frac{RI \times C3}{K}$$

When the pulse signal Ton/Duty/Vcon oscillates at a frequency FSW, ton=D/FSW. This means that the pulse signal Ton/Duty/Vcon oscillates at a constant frequency K/(RI·C3). The constant oscillation frequency facilitates the electromagnetic interference suppression. In an exemplary embodiment, the voltage source VA and the voltage source VB are fed into the regulating circuit control chip from outside the regulating circuit control chip. In another exemplary embodiment, the voltage source VA and the voltage source VB both are provided by internal circuits of the regulating circuit control chip. In another exemplary embodiment, just one of the voltage sources VA and VB is fed into the regulating circuit control chip from outside the regulating circuit control chip.

Figure 4:
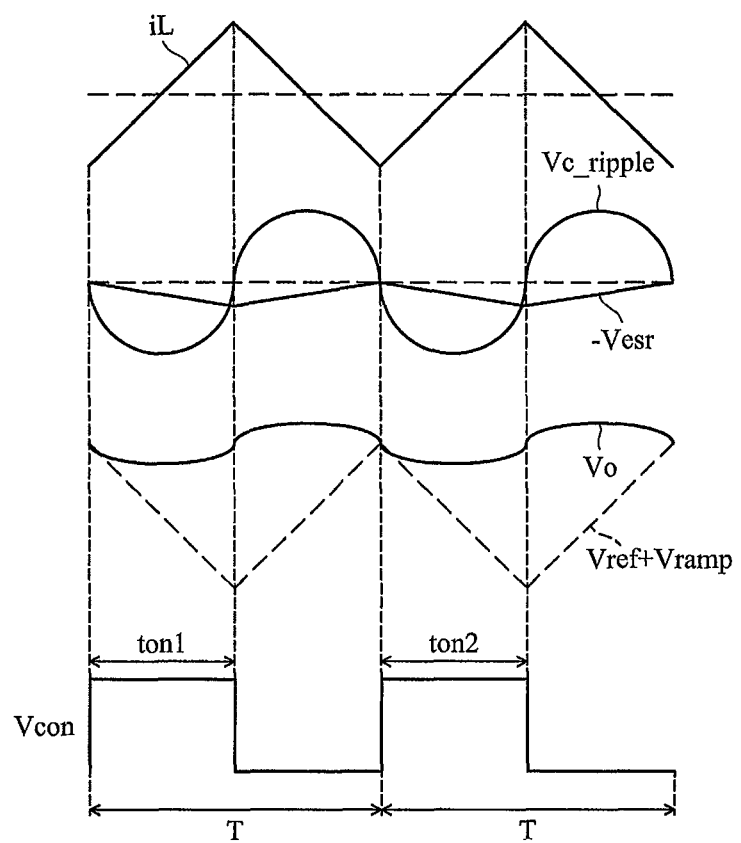
FIG. 4 shows signal waveforms for the voltage converter 100 while the load compensation circuit is that shown in FIG. 2 and the active-duration adjusting circuit is that shown in FIG. 3.

FIG. 4 shows signal waveforms for the voltage converter 100 while the load compensation circuit is that shown in FIG. 2 and the active-duration adjusting circuit is that shown in FIG. 3. As shown, when the equivalent serial resistance is quite low, there is an across voltage Vesr oscillating in an amplitude much smaller than that of the across voltage Vc_ripple of the equivalent capacitor, which makes the output voltage Vo significantly oscillate with the oscillation of the across voltage Vc_ripple of the equivalent capacitor. The oscillation of the output signal Vo is balanced by the comparison reference Vref+Vramp. Note that the pulse signal Vcon oscillates at a constant cycle period T while the duty cycle is adaptive (e.g., the active duration ton1 may be different from the active duration ton2). The current iL of the regulating circuit 102 may be controlled within a appropriate range.

While the invention has been described by way of example and in terms of the embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A voltage converter, comprising:
   a regulating circuit, regulating an input voltage to an output voltage in accordance with a pulse signal;
   a first comparator, comparing a first reference signal with a feedback value of the output voltage to generate a first comparator output, the first reference signal fluctuates in accordance with an active duration of the pulse signal;
   an active-duration adjusting circuit, starting the active duration of the pulse signal in accordance with the first comparator output and ending the active duration of the pulse signal in accordance with a second reference signal which has a dc value depending on a duty cycle of the pulse signal; and
   a load compensation circuit, performing a first-order filtering and a second-order filtering on the pulse signal to generate a first-order filtered signal and a second-order filtered signal,
   wherein:
   the first-order filtered signal and the second-order filtered signal are used in generating the first reference signal; and
   the second-order filtered signal works as the second reference signal.

2. The voltage converter as claimed in claim 1, wherein the load compensation circuit comprises:
   a first N-type transistor, coupled between a first voltage source and a ground terminal to operate in accordance with the pulse signal, wherein the first voltage source provides a square wave oscillating in accordance with the pulse signal;
   a first resistor and a first capacitor connected in series between the first voltage source and the ground terminal, wherein the first-order filtered signal is provided at a first connection node between the first resistor and the first capacitor; and
   a second resistor and a second capacitor connected in series between the first connection node and the ground terminal, wherein the second-order filtered signal is provided at a second connection node between the second resistor and the second capacitor.

3. The voltage converter as claimed in claim 1, wherein the active-duration adjusting circuit comprises:
   a current source, powered by a second voltage source which provides a square wave oscillating in accordance with the pulse signal;
   a third capacitor, receiving a current from the current source and coupling the current to a ground terminal; and
   a second comparator, comparing the second reference signal with a voltage level at a third connection node between the current source and the third capacitor, for determination of the active duration of the pulse signal.

4. The voltage converter as claimed in claim 3, wherein:
   the first comparator comprises a first differential input pair and a second differential input pair and compares a signal received by the first differential input pair with a signal received by the second differential input pair;
   the first differential input pair has a negative input terminal and a positive input terminal receiving the first-order filtered signal and the second-order filtered signal, respectively; and
   the second differential input pair has a positive input terminal and a negative input terminal receiving a constant reference signal and a voltage-divided signal of the output voltage, respectively.

5. The voltage converter as claimed in claim 4, wherein the active-duration adjusting circuit further comprises:
   a second N-type transistor, coupled between the third connection node and the ground terminal and operating in accordance with the first comparator output.

6. The voltage converter as claimed in claim 1, further comprising:
   a driving circuit, receiving an output from the active-duration adjusting circuit and adjusting a driving capability of the pulse signal before conveying the pulse signal to the regulating circuit and the load compensation circuit.

7. A regulating circuit control chip, providing a pulse signal to control a regulating circuit to regulate an input voltage to an output voltage, comprising:
   a first comparator, comparing a first reference signal with a feedback value of the output voltage to generate a first comparator output, the first reference signal fluctuating with an active duration of the pulse signal;
   an active-duration adjusting circuit, starting the active duration of the pulse signal in accordance with the first comparator output and ending the active duration of the pulse signal in accordance with a second reference signal, the second reference signal having a dc value depending on a duty cycle of the pulse signal;
   a first pin, coupled to the regulating circuit to operate the regulating circuit in accordance with the pulse signal;
   a second pin, coupled to receive the output voltage; and
   a load compensation circuit, performing a first-order filtering and a second-order filtering on the pulse signal to generate a first-order filtered signal and a second-order filtered signal, respectively,
   wherein the first-order filtered signal and the second-order filtered signal are used in generating the first reference signal and the second-order filtered signal works as the second reference signal.

8. The regulating circuit control chip as claimed in claim 7, further comprising:
   a driving circuit, receiving an output from the active-duration adjusting circuit and adjusting a driving capability of the pulse signal before conveying the pulse signal to the regulating circuit and the load compensation circuit.

* * * * *